(12) United States Patent
Furuhashi et al.

(10) Patent No.: US 7,273,335 B2
(45) Date of Patent: Sep. 25, 2007

(54) MACHINE TOOL

(75) Inventors: Seiji Furuhashi, Aichi (JP); Koji Takenaka, Aichi (JP)

(73) Assignee: Okuma Corporation, Niwa-gun, Aichi (JP)

( * ) Notice: Subject to any disclaimer, the term of this patent is extended or adjusted under 35 U.S.C. 154(b) by 0 days.

(21) Appl. No.: 11/174,721

(22) Filed: Jul. 6, 2005

(65) Prior Publication Data

US 2006/0008335 A1 Jan. 12, 2006

(30) Foreign Application Priority Data

Jul. 8, 2004 (JP) .............................. 2004-201311

(51) Int. Cl.
*B23C 1/06* (2006.01)
(52) U.S. Cl. ...................... 409/202; 409/191; 409/235; 409/238
(58) Field of Classification Search ................ 409/185, 409/190, 191, 202, 235, 238, 239
See application file for complete search history.

(56) References Cited

U.S. PATENT DOCUMENTS

| | | | | |
|---|---|---|---|---|
| 2,564,180 A | * | 8/1951 | Turrettini | 74/89.38 |
| 2,759,378 A | * | 8/1956 | Youssoufian et al. | 137/263 |
| 3,371,580 A | * | 3/1968 | Barnes et al. | 409/191 |
| 3,752,596 A | * | 8/1973 | Weyand et al. | 408/234 |
| 4,658,485 A | * | 4/1987 | Yang | 29/26 A |
| 5,314,397 A | * | 5/1994 | Mills et al. | 483/30 |
| 5,375,952 A | * | 12/1994 | Line | 409/202 |
| 5,919,012 A | * | 7/1999 | Nakagawa et al. | 409/132 |
| 5,933,933 A | * | 8/1999 | Fritz et al. | 29/33 P |
| 6,068,431 A | * | 5/2000 | Line | 409/202 |
| 6,174,271 B1 | * | 1/2001 | Kosmowski | 483/1 |
| 6,302,315 B1 | * | 10/2001 | Thompson | 228/112.1 |
| 6,357,094 B1 | * | 3/2002 | Sugimoto | 29/27 C |
| 6,439,813 B1 | * | 8/2002 | Repossini | 409/235 |
| 6,666,632 B1 | * | 12/2003 | Fioroni | 409/192 |
| 6,798,088 B2 | * | 9/2004 | Hsu et al. | 310/12 |

(Continued)

FOREIGN PATENT DOCUMENTS

DE           10235873 A1 * 2/2004

(Continued)

OTHER PUBLICATIONS

Patent Abstracts of Japan vol. 012, No. 010 (M-658).

(Continued)

*Primary Examiner*—Monica Carter
*Assistant Examiner*—Sara Addisu
(74) *Attorney, Agent, or Firm*—Jacobson Holman PLLC

(57) ABSTRACT

A machine tool includes a table supported by a bed for forward and rearward movement along a path of movement, left and right transversely aligned upright columns on opposite sides of the path of movement, a cross rail supported in the columns for movement upwardly and downwardly along forward and rear guide rails on inwardly facing column surfaces, a spindle head supported by the cross rail for movement leftwardly and rightwardly. The cross rail, the left and right columns, the spindle head and the guide rails are symmetrically positioned from front to rear and vertically by vertical or horizontal symmetry defining planes so that heat generated creates balanced self-cancelling forces.

12 Claims, 2 Drawing Sheets

U.S. PATENT DOCUMENTS

| | | | |
|---|---|---|---|
| 6,843,624 B2 * | 1/2005 | Sugata et al. | 409/235 |
| 7,043,805 B2 * | 5/2006 | Tokuma et al. | 29/27 C |
| 2002/0131836 A1 * | 9/2002 | Ferrari et al. | 409/212 |
| 2004/0086351 A1 * | 5/2004 | Kim et al. | 409/235 |
| 2004/0140721 A1 * | 7/2004 | Chang et al. | 310/12 |
| 2005/0135914 A1 * | 6/2005 | Valasek et al. | 414/680 |
| 2005/0139048 A1 * | 6/2005 | Feinauer et al. | 82/129 |

FOREIGN PATENT DOCUMENTS

| | | | |
|---|---|---|---|
| JP | 55 096209 A | | 7/1980 |
| JP | 61 219543 A | | 2/1987 |
| JP | 62 173128 A | | 7/1987 |
| JP | 02131830 A | * | 5/1990 |
| JP | 02 160440 A | | 6/1990 |

OTHER PUBLICATIONS

Patent Abstracts of Japan vol. 014, No. 416 (M-1021).
Patent Abstracts of Japan vol. 004, No. 143 (M-035).
Patent Abstracts of Japan vol. 011, No. 057 (M-564).

* cited by examiner

MACHINE TOOL

BACKGROUND OF THE INVENTION

The present invention relates to machine tools, and more particularly to machine tools having a gate structure.

Machine tools are already widely known which comprise a table supported by a bed for forward and rearward movement, left and right columns arranged upright on opposite sides of the path of movement of the table, a cross rail supported by the columns for upward and downward movement, and a spindle head supported by the cross rail for leftward and rightward movement. A vertical guide rail and a vertical screw rod are provided on the front side of the columns. The rear side of the cross rail is provided with a vertical guide groove having the vertical guide rail slidably fitted therein and with an internally threaded member screwed on the vertical screw rod. The front side of the cross rail is provided with a horizontal guide rail and a horizontal screw rod. The spindle head has a rear side provided with a horizontal guide groove having the horizontal guide rail slidably fitted therein and with an internally threaded member screwed on the horizontal screw rod.

Prior known machine tools become misadjusted following startup due to the creation of plurality of discrete separate unbalanced internal forces created by internal heat generation. Such forces act to distort the geometry of the spindle head support drive and guide means to detrimentally affect the accuracy of the machining function.

More specifically, in prior art devices during the upward and downward movement of the cross rail, the heat generated by the vertical guide rail and the vertical screw rod is released at the front side of each column where it tends to expand that portion of the column. Similarly, leftward and rightward movement of the spindle head results in localized heat generation by the horizontal guide rail and the horizontal screw rod which is also released at the front side of the cross rail. The concentrated heat production at forward portions of the structure consequently causes local deformation of the cross rail or columns which shifts the position of the spindle to impair the accuracy of machining functions of the equipment.

The preferred embodiment of the invention described below is proposed in order to overcome these problems (see, for example, JP-A No. 62-173128).

The present invention employs a unique combination of components oriented and constructed so as to avoid production of unbalanced concentrated heat relative to the cross rail and the columns so as to avoid creation of unbalanced forces which would cause misalignment of the spindle head and result in an inaccurate machining function.

SUMMARY OF THE INVENTION

An object of the present invention is to provide a machine tool which is free of unbalanced forces created by local concentrations of heat, is inexpensive and assures the accuracy of machining.

The preferred embodiment of the invention is directed to a machine including a table supported by a bed for forward and rearward movement along a path of movement extending between a left vertical column and a right vertical column. A cross rail is supported by the left vertical column and the right vertical column for upward and downward movement effected by cross rail drive means provided in the two vertical columns. Additionally, cross rail guide means in each of the vertical columns engage recesses in the ends of the cross rail for guiding the cross rail accurately with the guide means being parallel spaced vertical guide rails respectively symmetrically provided on opposite sides of a vertical front-rear symmetry defining plane. Additionally, the cross rail includes an elongated rectangular opening in which a spindle head is supported for movement leftwardly or rightwardly with the spindle head and the cross rail also being symmetrically positioned relative to the vertical front-rear symmetry defining plane. The symmetry of the structure about the vertical front-rear symmetry defining plane results in a lower incidence of undesirable heat concentrations which would tend to mis-position the spindle head.

With the machine tool of the present invention, the cross rail drive means and the cross rail guide means are symmetrically provided on the opposed sides of the pair of columns which sides are transversely aligned and facing each other, so that heat and resultant internal force generated by the cross rail drive means and the cross rail guide means is balanced and does not result in distortion of the spindle position.

More specifically, the pair of columns are formed symmetrically in front-rear direction relative to a transverse vertical front-rear symmetry defining plane with the columns being in transverse alignment with each other, and the cross rail being formed symmetrically about the transverse vertical front-rear symmetry defining plane with respect to the front-rear direction and being movable upward and downward by drive and guide means in each column. Portions of the cross rail which contact the columns are also symmetric in front-rear relation to the transverse vertical front-rear symmetry defining plane so that heat generated in the columns by operation of the device is symmetrically oriented in front-rear direction relative to the transverse vertical front-rear symmetry defining plane so as to avoid the creation of uneven heat distribution and hot spots in the columns and cross rail components which would result in undesirable excessive thermal expansion and warping of the components such as the cross rail and the columns which would result in incorrect positioning of the spindle.

Preferably, the cross rail drive means or and the cross rail guide means are also symmetrical about the transverse vertical front-rear symmetry defining plane with respect to the front-rear direction.

The cross rail has an elongated space or slot extending therethrough vertically and having the spindle head inserted into the space which is also symmetrical about the transverse vertical front-rear symmetry defining plane with respect to the front-rear direction.

The spindle head drive means is provided for driving the spindle head leftward and rightward along the elongated space or slot relative to the cross rail and spindle head guide means is provided for guiding the spindle head leftward and rightward. The spindle head is movable leftward and rightward while maintaining front-rear symmetry relative to the transverse vertical front-rear symmetry defining plane. All heat generated by the spindle head drive means or the spindle head guide means when the spindle head is moved leftward and rightward for the operation of the machine tool is symmetrically positioned in the front-rear direction relative to transverse vertical front-rear symmetry defining plane and forces generated forwardly of the transverse vertical front-rear symmetry defining plane cancel forces generated rearwardly of transverse vertical front-rear symmetry defining plane and mis-positioning of the spindle does not occur.

DESCRIPTION OF THE PREFERRED EMBODIMENT

An embodiment of the invention is described below with reference to the drawings.

In the following description, the terms "front" and "rear" refer to the side indicated by the arrow A in FIG. 1 and to the opposite side, respectively, and the terms "left" and "right" are used for the machine as it is seen from the rear side looking forward.

Figure 1:
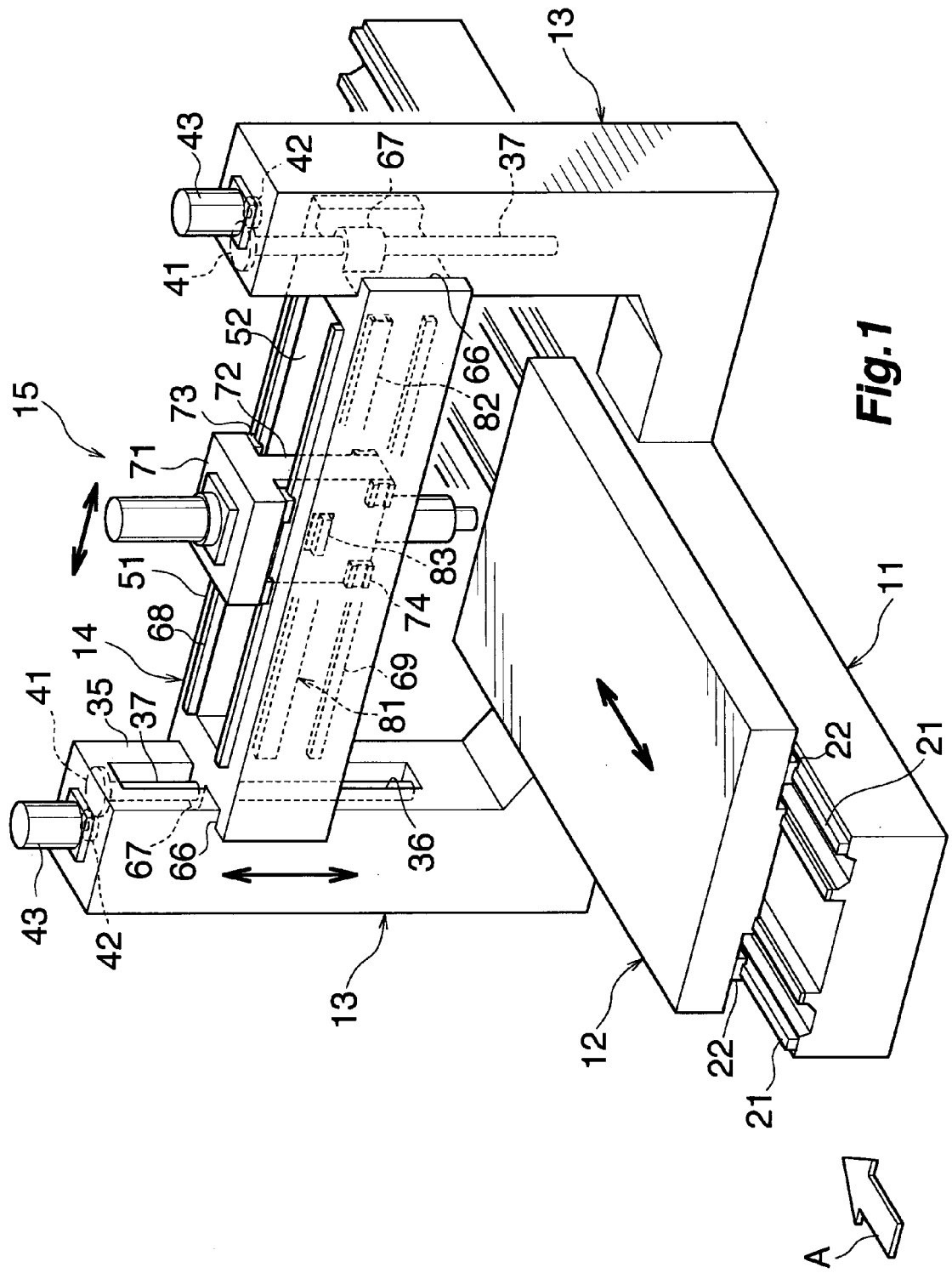
FIG. 1 is a perspective view of a machine tool according to the invention.

FIG. 1 shows a machine tool which includes a bed 11, a table 12 supported by the bed 11 which is movable forwardly and rearwardly. Left and right upright columns 13 are provided on opposite sides of the path of movement of the table 12 and a cross rail 14 which is supported by the columns 13 for movement upwardly and downwardly. A spindle head 15 is supported by the cross rail 14 for movement leftwardly and rightwardly.

The bed 11 is in the form of a rectangular box extending in the front-rear direction, and has four guide rails 21 provided on its upper side close to the left and right side edges thereof and extending in the front-rear direction.

The table 12 is in the form of a rectangular plate elongated in the front-rear direction and has on its lower side slide members 22 fitting on the front-rear guide rails 21.

Figure 2:
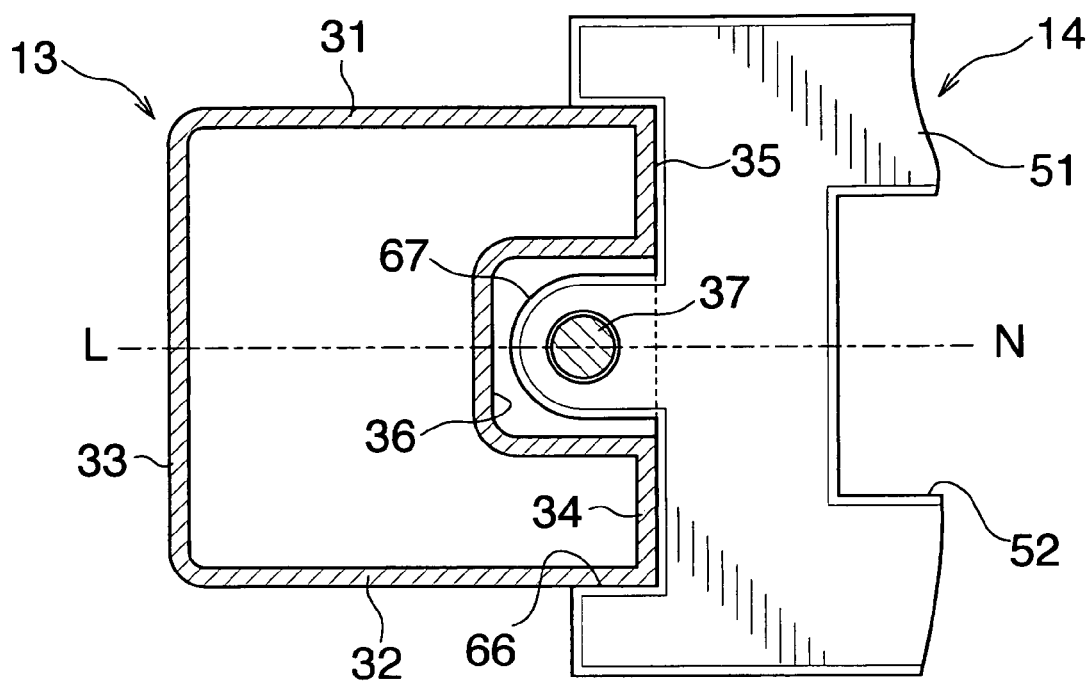
FIG. 2 is a horizontal sectional view of the left column and left end of the cross rail of the tool on an enlarged scale.

Although facing toward opposite directions with respect to the left-right direction, the columns 13 are of the same identical construction. Attention is invited to FIG. 2 in which left column 13 is illustrated in the form of a vertical tube having a generally square cross section and including a front side wall 31, rear side wall 32, left side wall 33 and right side wall 34. Left column 13 is symmetrical in the front-rear direction with respect to transverse vertical front-rear symmetry defining plane L, which is equidistantly positioned in the front to rear direction between the front side wall 31 and the rear side wall 32. Right column 13 is identical to, and a mirror image of, left column 13 and is symmetrical in front-rear direction with respect to transverse vertical front-rear symmetry defining plane N, which is coextensive with and part of transverse vertical front-rear symmetry defining plane L. Since planes L and N are coextensive, they are collectively referred to hereinafter as "transverse vertical front-rear symmetry defining plane L". Since left column 13 and right column 13 are identical and mirror images of each other, the following discussion of left column 13 is equally applicable to right column 13.

In left column 13 the right side wall 34 and right edge portions of the front side wall 31 and the rear side wall 32 integral with the wall 34 provide front and rear vertical guide rails 35. The right side wall 34 provides the outer ends of the guide rails 35. A U-shaped vertical groove 36 separates guide rails 35 and is formed in right side wall 34 by bending the wall into the illustrated U-shape. Vertical grooves 36 are symmetrical forwardly and rearwardly relative to transverse vertical front-rear symmetry defining plane L.

A vertical screw rod 37 (FIG. 1) is supported in each of the vertical grooves 36 by upward and lower walls of grooves 36 so that each screw rod extends the entire length of the groove in which it is mounted. The axis of each vertical screw rod 37 is positioned in transverse vertical front-rear symmetry defining plane L. A driven gear 41 is fixedly mounted on the upper end of each screw rod 37 and is in mesh with a drive gear 42 which is fixed to and driven by the rotating shaft of a motor 43 mounted on the top wall of each column 13. The guide rails 35, screw rods 37, drive gear 41, drive gear 42, and shaft of motor 43 are symmetric in front-rear direction relative to transverse vertical front-rear symmetry defining plane L and also are respectively transversely aligned relative to each other.

Figure 3:
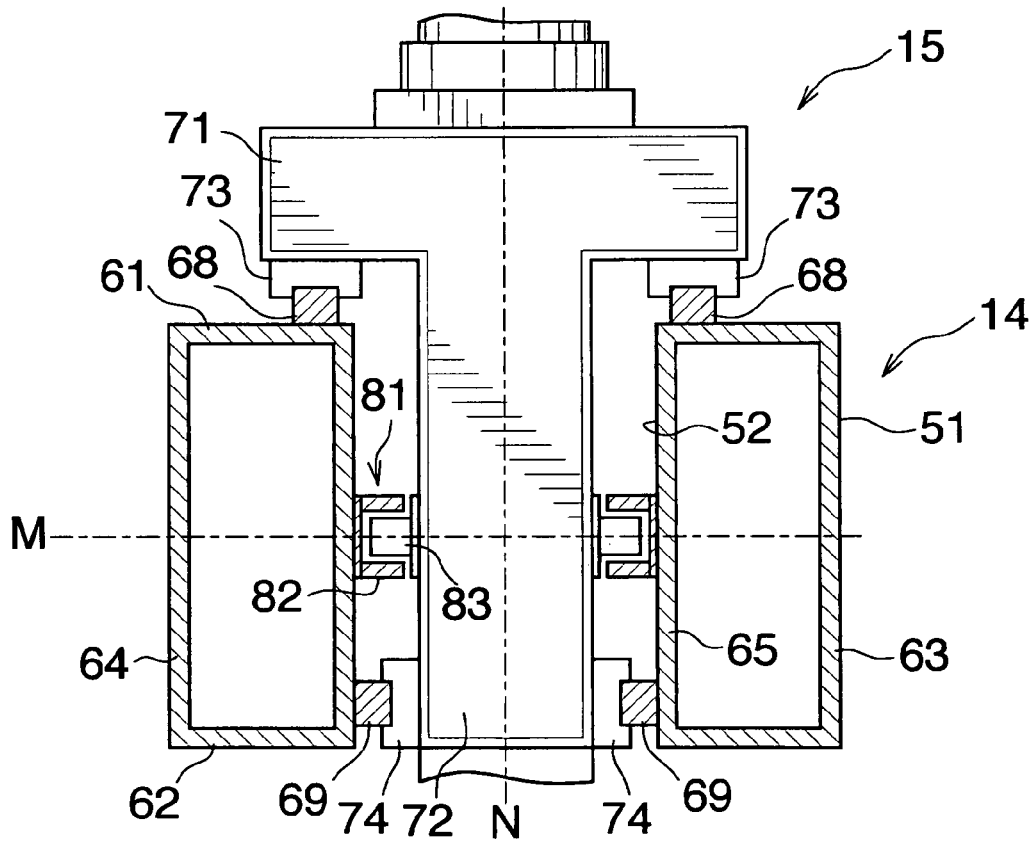
FIG. 3 is a vertical sectional view showing the cross rail and spindle head of the tool on an enlarged scale.

A vertically positionable transverse horizontal cross rail 14 has a hollow main body 51 of rectangular elongated shape extending transversely between columns 13 and is symmetric in front-rear direction relative to transverse vertical front-rear symmetry defining plane L. A center space or slot 52 extends vertically through and substantially across the length of main body 51. More specifically, the main body 51 includes top wall 61, bottom wall 62, front side wall 63, rear side wall 64 and a rectangular transversely extension peripheral wall 65 defining center space or slot 52 internally of cross rail 14 as shown in FIG. 3. A horizontal transverse vertical symmetry defining plane M is equidistantly positioned between the top wall 61, the bottom wall 62 and the cross rail main body 51. Thus, the cross rail is symmetric vertically with respect to horizontal transverse vertical symmetry defining plane M which in turn is perpendicular to transverse vertical front-rear symmetry defining plane L.

Guide grooves 66 (FIG. 2) in the form of an indentation in the cross section are formed in each of the left and right end walls 34 of the cross rail main body 51 and have fitted therein the guide rails 35 of the column 13. The guide rails 35 and the guide grooves 66 provide cross rail guide means for precluding forward or rearward movement of cross rail 14. The grooves 66 are symmetrical in front-rear direction relative to transverse vertical front-rear symmetry defining plane L. Cross rail support lugs 67 extend outwardly unitarily from the right and left ends of rail main body 51 and are symmetrical in front-rear direction relative to transverse vertical front-rear symmetry defining plane L. Each lug 67 has a threaded bore in which a vertical screw rod 37 is coaxially threadably received so that rotation of the screw rods by motors 43 results in raising or lowering of cross rail 14 while being concurrently guided by rails 35 and guide grooves 66.

A pair of front and rear horizontal upper support rails 68 (FIG. 3) extending in the left-right direction are provided respectively adjacent the front and rear portions of the upper-end of space 52 in the top wall 61 of cross rail 14. A pair of front and rear opposed horizontal lower support rails 69 extending in the left-right direction are provided respectively on lower edge areas of front and rear opposed portions of the peripheral wall 65. The upper support rails 68, as well as the lower support rails 69, are symmetrical in the front-rear direction relative to transverse vertical front-rear symmetry defining plane L.

The spindle head 15 (FIG. 1), which is generally T-shaped in cross section, comprises a horizontal upper member 71 mounted on both the upper support rails 68, and a vertical lower member 72 extending downward from the upper member 71 into the center space 52. The cross section of the spindle head 15 is symmetrical in the front-rear direction about the transverse vertical front-rear symmetry defining plane L.

The upper member 71 is provided on the bottom side thereof with upper slide members 73 fitted on and moveable along the respective upper support rails 68. The upper member 71, lower member 72, upper support rails 68 and lower support rails 69 provide means for guiding the spindle head 15 along guide rail 14. The lower member 72 is provided, on lower edge portions of front and rear opposite sides thereof, with lower slide members 74 fitting respectively on the lower support rails 69.

Linear motors 81 serving as spindle head drive means are provided in the center space 52 between the front and rear opposed surfaces of the peripheral wall 65 and the front and rear opposite sides of the lower member 72. Each of the linear motors 81 comprises a slide 82 fixed to the front or rear surface of the peripheral wall 65, and a movable member 83 fixed to the front or rear side of the lower member 72 opposed to the peripheral wall and symmetrically positioned in a front-rear direction relative to transverse vertical front-rear symmetry defining plane L.

When the machine tool described above is used for machining, heat is generated by several of the components including slide members 73 and 74, support rails 68 and 69, the spindle drive motor and the machining action on the work piece and by the bearings supporting the unillustrated spindle. Since the spindle head is symmetric in the front-rear direction relative to transverse vertical front-rear symmetry defining plane L, heat buildup forwardly of transverse vertical front-rear symmetry defining plane L is the same as the heat buildup rearwardly of transverse vertical front-rear symmetry defining plane L and the thermally generated forces generated forwardly of the transverse vertical front-rear symmetry defining plane L are balanced by the heat generated forces rearwardly of the transverse vertical front-rear symmetry defining plane L so as to preclude undesirable column and spindle head deformation and resultant undesirable spindle head tilting displacement forwardly or rearwardly of the desired position for the particular machining operation desired to be effected.

The linear motors 81 and moveable slides 83 are symmetrical vertically above and below horizontal transverse vertical symmetry defining plane M and the cross rail 14 is similarly vertically symmetric in the up-down direction relative to the horizontal transverse vertical symmetry defining plane M, the thermally generated forces above and below the horizontal transverse vertical symmetry defining plane M cancel each other out. The spindle consequently remains properly aligned.

Similarly, the front-rear symmetry of columns 13 and cross rail 14 relative to the transverse vertical front-rear symmetry defining plane L prevents the generation of undesirable thermal deformation which would mis-align the spindle in the front-rear direction.

The screw rod 37, motor 43 for driving the rod 37, internally threaded cross rail support lugs 67, driven gear 41 and drive gear 42 are used as means for vertically moving the cross rail 14. However, the driven gear 41 and the drive gear 42 are not always needed; if a motor is selected which affords the required output and rotation, the motor may be coupled directly to the screw rod 37. The linear motor described as means for driving the spindle may alternatively be used as the cross rail drive means. In this case, the stationary side 82 may be provided on the column 13 in place of the screw rod 37, and the movable side 82 on the cross rail 14 in place of the internally threaded member 67.

Although the linear motor 81 is used as the spindle drive means, a screw rod may be used for driving. In this case, the screw rod 37 is provided on the cross rail 14 in place of the stationary side 82, and the internally threaded member 67 on the spindle head 15 in place of the movable side 83.

Although the guide rails 35 and guide grooves 66 provide a slide structure for use as cross rail guide means, the upper slide members 73, lower side members 74, upper support rails 68 and lower support rails 69 already described as spindle head guide means may provide antifriction guide structure for this purpose. In this case, the support rails are provided vertically on the column 13 in place of the guide rails 35, and a member corresponding to the upper slide member on the cross rail in place of the guide grooves 66.

Similarly the spindle head guide means may comprise a slide structure. In this case, the support rails are replaced by guide rails 35 as arranged horizontally on the cross rail 14, and the upper and lower slide members 73 and 74 are replaced by guide grooves 66 formed in the spindle head.

The linear motors 81 are arranged in horizontal alignment on and relative to horizontal transverse vertical symmetry defining plane M. However, this arrangement is not always needed. If the displacement in the front-rear direction is merely considered, the linear motors 81 may be shifted to an upper or lower position insofar as they are arranged symmetrically about transverse vertical front-rear symmetry defining plane L with respect to the front-rear direction. The position of the screw rod 37 or the guide rail 35, and the shape of the cross rail 14, column 13 or spindle head 15 need not always be strictly symmetric about a plane of symmetry but can be somewhat modified in position or shape in view of other design problems insofar as the accuracy of positioning can be ensured as required.

What is claimed is:

1. A machine tool comprising a table supported by a bed for forward and rearward movement along a linear path of movement, left and right upright columns respectively provided on opposite sides of the linear path of movement of the table and having inwardly facing opposed surfaces, a cross rail comprising a rigid unitary structure extending transversely over and fixedly maintained in perpendicular orientation relative to the linear path of movement and in transverse alignment with and in facing contact with the inwardly facing opposed surfaces of the upright columns and supported by the upright columns solely for upward and downward movement, cross rail drive means supported in each upright column for driving the cross rail upward and downward, cross rail guide means provided in the inwardly facing surfaces of the upright columns for engaging and guiding the cross rail vertically upwardly and downwardly, and a spindle head supported by spindle head guide means mounted on the cross rail for transverse movement leftwardly and rightwardly along the cross rail by spindle head drive means, the machine tool being characterized in that the cross rail drive means in the left and right upright columns are transversely aligned with each other and the cross rail guide means in the left and right upright columns are transversely aligned with each other.

2. A machine tool according to claim 1, wherein the upright columns and the cross rail are fixedly and symmetrically positioned in a front to rear direction relative to a transverse vertical front-rear symmetry defining plane.

3. A machine tool according to claim 2, wherein the cross rail drive means is fixedly and symmetrically positioned in the front-rear direction relative to the transverse vertical front-rear symmetry defining plane.

4. A machine tool according to claim 2, wherein the cross rail guide means is symmetrical in the front-rear direction relative to the transverse vertical front-rear symmetry defining plane.

5. A machine tool according to claim 1, wherein the cross rail includes an internal closed wall open topped transversely oriented center space extending vertically downward through the cross rail, and, wherein the spindle head is fixedly positioned and supported in and extends below the center space, and, wherein the spindle head, the spindle head guide means and the spindle head drive means are symmetrical in the front-rear direction relative to the fixedly positioned transverse vertical front-rear symmetry defining plane.

6. A machine tool according to claim 5, wherein the spindle head guide means comprises a forward guide rail positioned forwardly of the cross rail center space and a rear guide rail positioned rearwardly of the cross rail center space.

7. A machine tool according to claim 5, wherein the inwardly facing opposed surfaces of each upright column comprise an inwardly facing side wall having an outwardly bulging portion extending vertically along the height of the upright column to define an inwardly facing vertical groove, and, wherein the cross rail includes a cross rail support lug at each end of the cross rail extending into one of the vertical grooves, and, wherein the cross rail drive means includes a motor-driven vertical screw rod extending along the length of each of the vertical grooves and drivingly engaged with the cross rail support lug in the vertical groove.

8. A machine tool comprising a work support having a right side and a left side, a vertical left column positioned adjacent the left side of the work support, a vertical right column positioned adjacent the right side of the work support and transversely aligned with the vertical left column, a vertically moveable but otherwise fixedly positioned rigid non-articulated cross rail having a left end and a right end and extending between the vertical left column and the vertical right column, a spindle head mounted internally of and extending vertically through the cross rail, a left vertically extending power driven screw supported by the vertical left column supporting and operable for vertically positioning the left end of the cross rail, a right vertical extending power driven screw supported by the vertical right column and supporting and operable for vertically positioning the right end of the cross rail, and, wherein the vertical left column, the vertical right column, the cross rail, the left vertically extending power driven screw and the right vertically extending power driven screw are symmetrically positioned in front-rear direction relative to a fixedly positioned transverse vertical front-rear symmetry defining plane.

9. A machine tool as recited in claim 8, wherein the left vertically extending power driven screw is positioned internally of a vertical groove in the vertical left column and is threadably engaged with a cross rail support lug on the right end of the cross rail and the right vertically extending power driven screw is positioned internally of a vertical groove in the vertical right column and is threadably engaged with a cross rail support lug on the right end of the cross rail.

10. A machine tool as recited in claim 8, wherein the cross rail is vertically symmetrical relative to a fixedly positioned horizontal transverse vertical symmetry defining plane.

11. A machine tool as recited in claim 8 additionally including front and rear horizontal upper support rails on the cross rail supporting the spindle head for movement transversely of the machine tool and front and rear linear motors mounted internally of the cross rail for effecting transverse movement of the spindle head relative to the machine tool, wherein the vertical left column and the vertical right column each have an inwardly facing front guide rail and an inwardly facing rear guide rail separated by an inwardly extending groove, wherein the front and rear guide rails respectively engage front and rear guide slots in each end of the cross rail for guiding vertical movement of the cross rail, and, wherein the front and rear guide rails, the front and rear horizontal upper support rails and the front and rear linear motors are respectively symmetrically positioned in front-rear direction relative to the fixedly positioned transverse vertical front-rear symmetry defining plane.

12. A machine tool as recited in claim 11, wherein the cross rail is vertically symmetrical relative to a horizontal transverse vertical symmetry defining plane.

* * * * *